United States Patent

[11] 3,569,620

[72] Inventor Leonard J. Baun
Cinnaminson, N.J.

[21] Appl. No. 809,248
[22] Filed Mar. 21, 1969
[45] Patented Mar. 9, 1971
[73] Assignee RCA Corporation

[54] AUTOMATIC VIDEO SIGNAL GAIN CONTROLLING APPARATUS
14 Claims, 15 Drawing Figs.

[52] U.S. Cl. .......... 178/7.3
[51] Int. Cl. .......... H04n 5/56
[50] Field of Search .......... 178/7.3 (DC), 7.5 (DC), 7.1 (DC)

[56] References Cited

UNITED STATES PATENTS

| | | | |
|---|---|---|---|
| 3,437,750 | 4/1969 | Hedger et al. | 178/7.3 DC |
| 3,441,669 | 4/1969 | Janson et al. | 178/7.3 DC |
| 3,449,513 | 6/1969 | Jachim | 178/7.3 DC |

*Primary Examiner*—Richard Murray
*Assistant Examiner*—John C. Martin
*Attorneys*—William H. Meagher and Eugene M. Whitacre

ABSTRACT: The synchronizing pulse components of a composite video signal are maintained at a desired level at the output of a video amplifier by means of a first automatic gain control (AGC) system associated with the video amplifier. The video amplifier output is further processed by means of an automatic video signal gain-controlling apparatus which maintains peak white video signal levels in substantially fixed relationship with respect to black level video signals substantially independently of average brightness of the image represented by the video signals.

INVENTOR
Leonard J. Baun
BY William H. Meagher
ATTORNEY

INVENTOR
Leonard J. Baun
BY William H. Meagher
ATTORNEY

INVENTOR
Leonard J. Baun

BY William H. Meagher
ATTORNEY

AUTOMATIC VIDEO SIGNAL GAIN CONTROLLING APPARATUS

AUTOMATIC VIDEO SIGNAL GAIN CONTROLLING APPARATUS

Background of The Invention

In the production of video signal composite video signal in a television system for transmission, many operations must be performed on the signals which are received either directly or by a space or other transmission path, such as a network link, from signal-generating apparatus. One such operation is a gain control of the signal so as to maintain it at a substantially constant level. One method which has been used is to effect such video signal gain control by means responding to the amplitude of the synchronizing pulses of the composite signal. Another method is to produce the gain control signal by detecting the amplitude either of the video signal or of selected pulses introduced into the composite video signal during blanking intervals.

In a system in which the automatic gain control (AGC) signal is derived from the video signal it has been customary to employ a single detection arrangement in which the picture white representative signal level relative to the picture black representative signal level is converted to constitute the AGC signal. Consequently, whether the video signal was that of a high or a low average picture level (APL), the single detection of the video signal made it necessary to design the system so that its recovery time to changing video signal levels was dependent upon the time constant of the circuit required to filter the AGC signal derived from the low APL signals. Because the television field period (16.7 milliseconds) is involved in such design, the filter circuit time constant for acceptable operation must necessarily be longer than the field period in order that the resulting AGC signal be sufficiently steady to obviate objectionable field-rate gain modulation, especially for low APL video signals. Also, for a filter circuit with a single fixed time constant, the recovery time of the gain control circuit will vary with the APL represented by the video signal. Thus, it is seen that two of the inherent disadvantages of an automatic gain control system employing a single video signal detection arrangement are the relatively long and varying recovery times responsive to changes of video signal levels. Hence, rapid video signal variations result in an objectionable sluggish response by such a system. Rapid or sudden changes of the video signal levels are not uncommon in the operation of a television system as, for example, in a direct switch from an all black picture representative video signal to one representing a relatively high average picture level.

It, therefore, is an object of the present invention to provide a novel double detection video signal gain control system in which the video signal level is maintained substantially constant under the control of information derived from the picture representative portion of the video signal itself.

In the gain-controlling apparatus embodying the invention a sample of the composite video signal, taken from the output of a gain-controlled amplifier has its picture black representative portions clamped at a fixed reference potential such as ground. The resultant signal is sampled for its picture white representative portions exceeding a selected threshold level to produce a first detected wave of greater amplitude than but corresponding to the white signal samples. Also developed is a second detected wave which is the inverse of the first wave. Both detected waves are impressed upon a nonadditive mixer which produces a gain-control signal in response only to the wave having the larger value and to the exclusion of any response to the wave having the smaller value. This signal is used to control the video signal amplification by the gain-controlled amplifier.

For a more specific disclosure of the invention, reference may be had to the following detailed description of a successfully operated illustrative embodiment which is given in conjunction with the accompanying drawings, of which:

Figure 1:
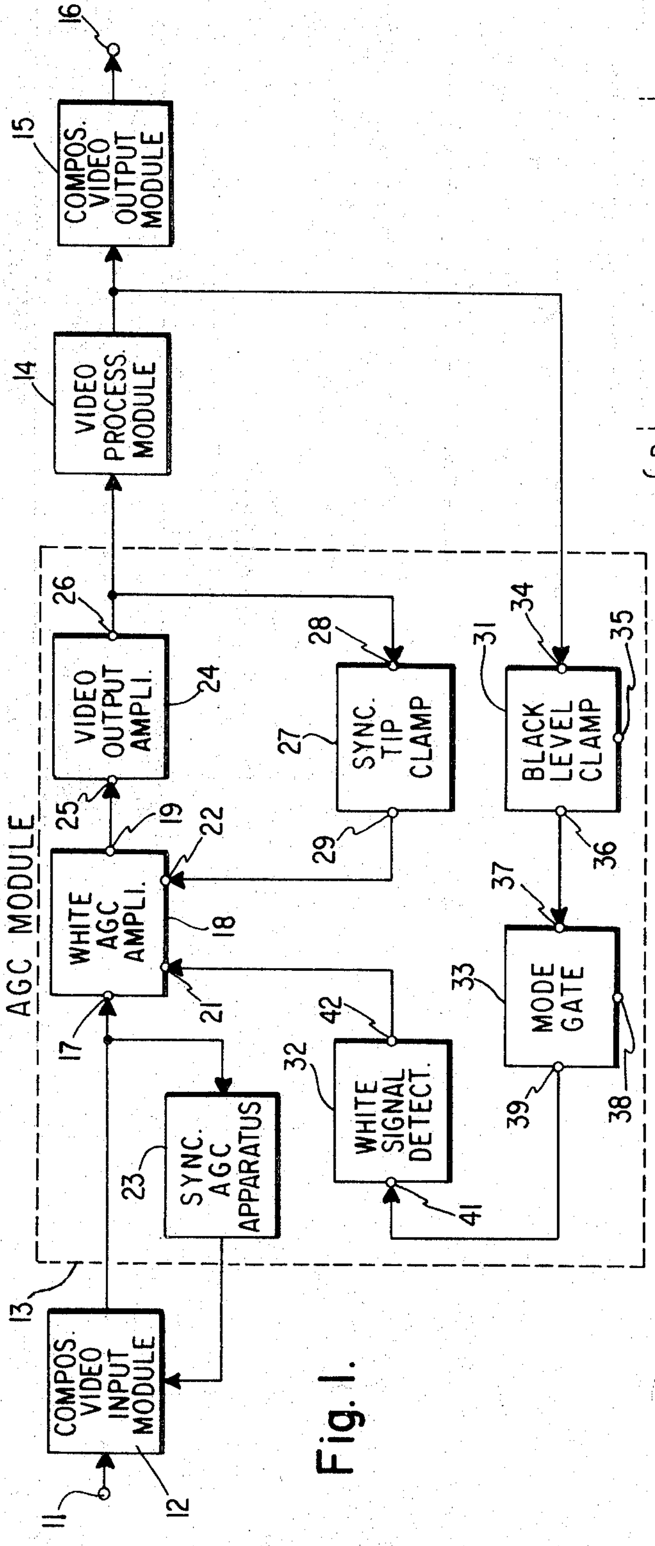
FIG. 1 is a block diagram of the video signal gain-controlling apparatus embodying the invention as incorporated in a video signal processing system.

In FIG. 1 a composite video signal, including at least picture representative signals and horizontal and vertical blanking and synchronizing pulses (and in some cases a vertical interval test signal) supplied at an input terminal 11 of a composite video input module 12, is passed through an automatic gain-control (AGC) module 13, incorporating the present invention, and a video signal-processing module 14 to a video output module 15 having an output terminal 16. In the AGC module 13 the composite video signal is applied to the input terminal 17 of a white AGC amplifier 18 which also has an output terminal 19 and two control signal terminals 21 and 22. The signal applied to the terminal 21 control the gain of the amplifier and the signal applied to the terminal 22 effects a direct current component compensation, both of which controls will be described in detail subsequently, A sample of the composite video signal applied to the input terminal 17 of the white AGC amplifier 18 is impressed upon a sync AGC apparatus 23 which produces a gain-control signal that is applied to the input module 12 to effect a gain control of the composite video signal in accordance with the synchronizing pulse amplitude. Although the sync AGC apparatus 23 forms no part of the invention, it is shown diagrammatically in this FIG. in the interest of completely disclosing herein all of the principal elements of a successfully operated AGC module 13. The AGC module 13 also includes a video output amplifier 24 having an input terminal 25, which is coupled to the output terminal 19 of the white AGC amplifier 18, and an output terminal 26, which is coupled to the video signal-processing amplifier 14. Also, the AGC module 13 includes a sync tip clamp 27 which has an input terminal 28 coupled to the output terminal 26 of the video output amplifier 24 and an output terminal 29 coupled to the control terminal 22 of the white AGC amplifier 18. The video output amplifier 24 and the sync tip clamp 27 are not part of the present invention but are shown in the interest of a complete disclosure of the elements of the AGC module 13.

In addition to the white AGC amplifier 18, the other elements of the AGC module 13 comprising the invention are a black level clamp 31, a white signal detector 32 and a mode gate 33 used in cases where the composite video signal includes a vertical interval test signal. A composite video signal sample, derived from the output of the video signal-processing module 14, is impressed upon the input terminal 34 of the black level clamp 31 which operates under the control of a clamp pulse applied during horizontal blanking intervals to a terminal 35 to produce a video signal at an output terminal 36 in which the picture black representative signals are clamped at a reference potential such as ground, for example. The clamped video signal developed at the output terminal 36 of the clamp 31 is applied to an input terminal 37 of the mode gate 33 which operates under the control of a gating pulse applied during vertical test signal intervals to a terminal 38 to produce at its output terminal 39 either one or both of the video and vertical interval test signals. The signal derived from the output terminal 39 of the mode gate 33 is impressed upon an input terminal 41 of the white signal detector 32 which functions to produce at its output terminal 42 a unidirectional AGC control signal. The AGC control signal is applied to the control signal terminal 21 of the white AGC amplifier 18 and is effective to control the composite video signal amplification so as to automatically maintain the peak video signal amplitude substantially at a desired level.

Figure 2:
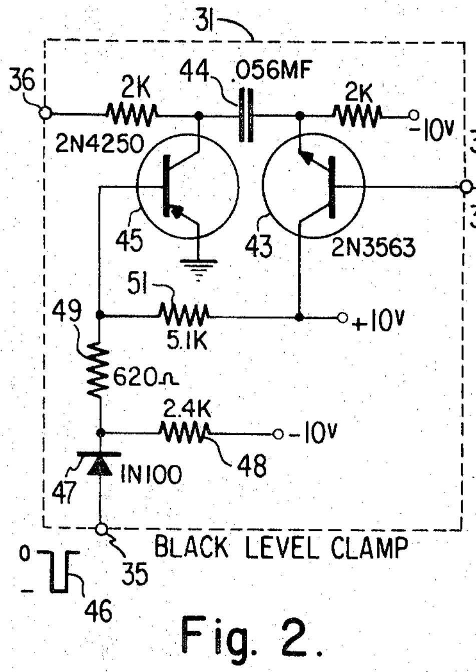
FIG. 2 is a schematic circuit diagram of the black level clamp of FIG. 1.

In FIG. 2 the composite video signal impressed upon the input terminal 34 of the black level clamp element 31 is one in which the picture white representative signals are negative-going relative to the picture black representative signals. Such a video signal is amplified by means including an NPN video amplifier transistor 43 and coupled by a capacitor 44 to the collector electrode of a PNP black level clamp transistor 45, the emitter electrode of which is connected to reference ground potential. The clamp transistor 45 is controlled by a clamp pulse 46 applied to the terminal 35 during horizontal blanking periods. During the picture signal portions of the horizontal line periods the pulse 46 has a substantially zero (0) potential which causes an overload protection diode 47 to conduct through a resistor 48, thereby applying a cutoff potential to the base electrode of the clamp transistor 45. During blanking portions of the horizontal line periods the clamp pulse has a negative potential which cuts off conduction through the diode 47, thereby effecting the application to the base electrode of the clamp transistor 45 of a potential which is sufficiently negative to drive the transistor 45 into saturation. This negative potential is derived from a voltage divider comprising the resistor 48 and two additional resistors 49 and 51 having substantially the values indicated. Thus, during negative-going blanking interval excursions of the clamp pulse 46, the collector electrode of the clamp transistor 45 is substantially at ground potential, thereby effectively clamping the picture black representative signals substantially at ground potential.

Figure 3:
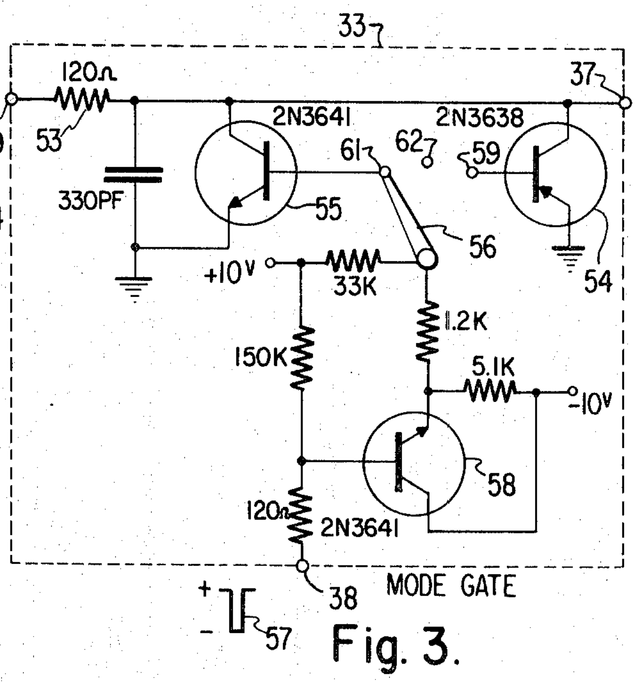
FIG. 3 is a schematic circuit diagram of the mode gate of FIG. 1.

The clamped video signal developed at the output terminal 36 of the black level clamp 31 of FIG. 2 is impressed upon the input terminal 37 of the mode gate 33 of FIG. 3 from which it is transferred through a path which includes a series resistor 53 to the output terminal 39 of the mode gate. This apparatus also includes a PNP video signal-selecting transistor 54 and an NPN vertical interval test signal-selecting transistor 55, both of which have their collector-to-emitter electrode paths connectable from the input electrode 37 to ground. The signal-selecting transistors 54 and 55 are operably controlled by a selector switch 56 and a gating pulse 57 impressed upon the terminal 38. This pulse has a positive potential at all times except during the occurrence of the vertical interval test signal when it has a negative potential. The gating pulse 57 is applied to the selector switch 56 by an NPN pulse-amplifying transistor 58 which is connected for operation as an emitter follower. The selector switch 56 has two contacts 59 and 61 connected respectively to the base electrodes of the video and vertical interval test signal-selecting transistors 54 and 55 and a third contact 62 which is unconnected.

When the switch 56 is operated to its contact 59, the gating pulse 57 impresses a positive potential upon the base electrode of the video signal-selecting transistor 54 at all times except during the occurrence of the vertical interval test signal, thereby cutting off this transistor and allowing all picture representative information of the video signal to be transferred to the output terminal 39 of the mode gate 33. During negative excursion of the gating pulse 57 the transistor 54 is driven into saturation, thereby effectively connecting the input electrode 37 to ground and preventing any signal (including the vertical interval test signal) transfer to the output terminal 39 during the occurrence of the vertical interval test signal. This, however, is immaterial because there is no picture representative information in the video signal at this time. Also, with the selector switch connected to its contact 59, the base electrode of the vertical interval test signal-selecting transistor 55 is unconnected, thereby rendering this transistor cutoff at all times.

When the selector switch 56 is operated to its contact 61, the gating pulse 57 impresses a positive potential upon the base electrode of the vertical interval test signal-selecting transistor 55 at all times except during the vertical interval test signal occurrence, thereby driving this transistor into saturation and preventing the transfer of any picture representative information of the video signal to the output terminal 39 of the mode gate 33. During negative excursions of the gating pulse 57 the transistor 55 is cut off, thereby allowing the transfer of the vertical interval test signal to the output terminal 39. Also, with the selector switch connected to its contact 61, the base electrode of the video signal-selecting transistor 54 is unconnected, thereby rendering this transistor cutoff at all times.

When the selector switch 56 is operated to its contact 62, the base electrodes of both signal-selecting transistors 54 and 55 are unconnected, thereby cutting off these transistors at all times. Thus, both the picture representative and the vertical interval test signals are transferred to the output terminal 39 of the mode gate 33. In such an operating mode, the automatic gain control of the composite video signal will be effected by the signal having the higher peak white representative portions as will be seen from the following description of the operation of the white signal detector 32.

Figure 4:
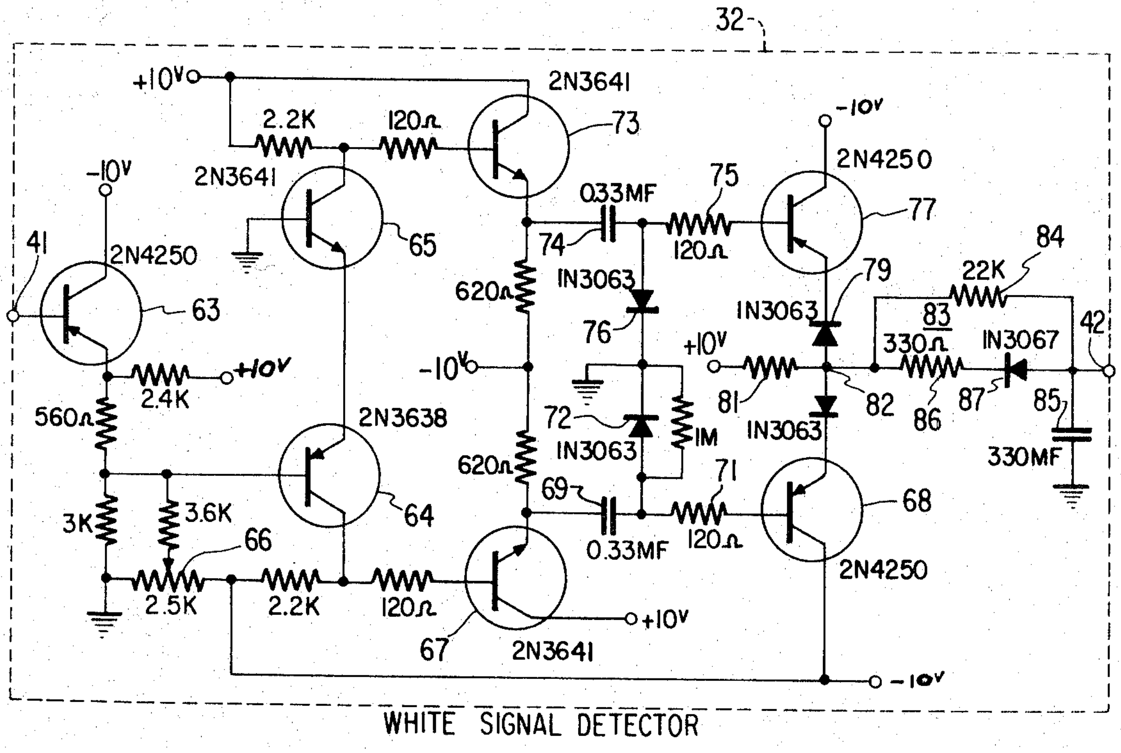
FIG. 4 is a schematic circuit diagram of the white signal detector of FIG. 1.

The signal developed at the output terminal 39 of the mode gate 33 of FIG. 3 is impressed upon the input terminal 41 of the white signal detector 32 of FIG. 4 from which it is applied to the base electrode of a PNP white video signal sampler driver transistor 63 which is connected for operation in an emitter follower mode. The white video signal sampler includes a PNP signal-sampling transistor 64 and an NPN signal sample inverting transistor 65. It is to be noted that the video signal developed at the emitter electrode of the driver transistor 63 and applied to the base electrode of the signal-sampling transistor 64 has the same polarity as the signal impressed upon the input terminal 34 of the black level clamp 31 of FIG. 2, that is one in which picture white representative signals are negative relative to the clamped picture black representative signals.

The function of the white video signal sampler is to extract from the composite video signal only picture white representative portions exceeding a selected threshold amplitude. In order to accomplish this the base electrode of the signal-sampling transistor 64 is biased by means including a potentiometer 66 so that the signal-sampling transistor is rendered conducting only by those picture white representative signal portions having amplitudes greater than a selected threshold amplitude. Thus, the number, time duration and time spacing of the white signal samples produced at the emitter and collector electrodes of the transistor 64 may vary over a relatively wide range and may have duty cycles which vary from very short to very long, whereby a unidirectional signal derived from such samples would not, in all cases, be truly representative of the amplitudes of the white signal portions of the video signal and, hence, would not provide a highly accurate gain control signal.

Accordingly, the particular white signal detector 32 of FIG. 4, constituting a feature of the invention, includes a low average picture level (APL) detector and a high average picture level (APL) detector. The low APL detector includes an NPN coupling transistor 67 and a nonadditive mixer signal combiner transistor 68, both of which are connected as emitter followers. The base electrode of the coupling transistor 67 is coupled to the collector electrode of the signal sampling transistor 64 to receive the picture white representative samples of the video signal in which the white signals are of positive polarity relative to the picture black representative portions of the video signal. The coupling circuit between the emitter electrode of the coupling transistor 67 and the base electrode of the combiner transistor 68 includes the series connection of a capacitor 69 and a resistor 71, and a diode 72 connected from the junction of capacitor 69 and resistor 71 to reference ground potential. This coupling circuit functions to impress upon the combiner transistor 68 a wave of negative polarity and an amplitude corresponding to the amplitude of the white signal samples derived from the coupling transistor 67. The high APL detector is similar to the low APL detector and includes an NPN coupling transistor 73 having its base electrode coupled to receive the output of the inverter transistor 65 and its emitter electrode coupled to the base electrode of a second nonadditive mixer signal combiner transistor 77 by means of a circuit including a series connected capacitor 74 and resistor 75 and a diode 76 connected from the junction of capacitor 74 and resistor 75 to ground potential.

The signal combiner comprising the transistors 68 and 77 of the same conductivity type have individual input circuits including their respective base electrodes and a common output circuit including the interconnection of their respective emitter electrodes through protective diodes 78 and 79 and a load resistor 81. The diodes 78 and 79 serve to protect, from any excessive reverse emitter-to-base voltage, the combiner transistors 68 and 77 which function as a nonadditive mixer to develop, across the load resistor 81 at the output point 82 of the signal combiner, an output gain-control signal corresponding to the value of that one of the white signal sample waves impressed upon the base electrodes of the combiner transistors 68 and 77 which has the greater amplitude.

The gain-control signal developed at the output point 82 is transferred to the output terminal 42 of the white signal detector 32 by a two-branch coupling circuit 83. One branch of the coupling circuit 83 comprises a relatively large value resistor 84 connected between the output point 82 and the output terminal 42 and forms a coupling path having a relatively long time constant with a capacitor 85 connected from the output terminal 42 to ground. The other branch of the coupling circuit 83 comprises a series connection of a relatively small value resistor 86 and a diode 87 connected between the output point 82 and the terminal 42 and forms a coupling path having a relatively short time constant with the capacitor 85. This particular type of coupling circuit effects a relatively fast application to the white AGC amplifier 18 of a negative-going gain-control signal representing a sudden increase of the picture light level, thereby to effect a rapid compensating gain control of the video signal to reduce its level to that desired. Thus, any sudden amplitude increase of the negative-going gain-control signal produced at the output point 82 of the signal combiner is transferred to the output terminal 42 and, thence, to the white AGC amplifier 18 by the short time constant branch of the coupling circuit 83 including the resistor 86 and the diode 87. Any sudden amplitude decrease of the gain control is more slowly transferred to the output terminal 42 and to the white AGC amplifier 18 by the long time constant branch of the coupling circuit including the resistor 84. Such a coupling circuit prevents the AGC control of the video signal from oscillating or hunting in cases where the average picture level alternates rapidly between high and low levels.

For an illustrative description of the operation of the white signal detector 32 of FIG. 4 its response to both low and high average picture level video signals will be considered. It will be assumed that the threshold potentiometer 66 is adjusted the same for both cases so that the signal sampling transistor 64 only produces both high and low APL white signal samples which exceed the threshold level. Also, it will be assumed that the white signal samples have the same peak amplitudes in both high and low APL cases, the samples differing only in number, time duration and/or time spacing.

Figures 8A, 8B, 8C, 8D:
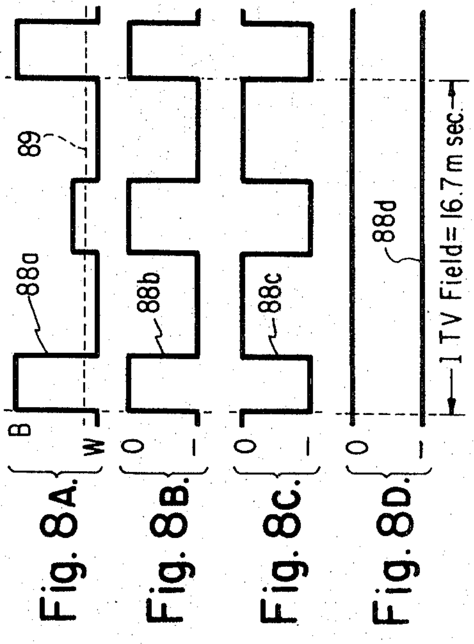

Consider first a video signal representing a picture having a relatively high average light level as represented by the wave 88a of FIG. 8A. Such a signal, when it is sampled by the transistor 64 for its negative-going picture white representative information exceeding the selected threshold 89 set by the potentiometer 66 and the white samples are greatly amplified by the sampling transistor 64, is processed by the coupling circuit including the transistor 67, the capacitor 69, the resistor 71 and the DC restorer diode 72 to produce the relatively long duty cycle wave 88b of FIG. 8B. The transistor 65, together with the coupling circuit including the transistor 73, the capacitor 74, the resistor 75 and the DC restorer diode 76, produces the wave 88b of FIG. 8C which is the inverse of the wave 88bof FIG. 8B. The amplified sample waves 88b and 88c of FIGS. 8B and 8C respectively are impressed upon the signal combiner transistors 68 and 77 respectively of FIG. 4. The negative-going portions of the wave 88b cause the combiner transistor 68 to conduct, thereby developing a negative voltage at the output point 82 of FIG. 4 which in conjunction with the applied positive-going portion of wave 88c biases off the combiner transistor 77. Similarly, the negative-going portions of the wave 88c causes conduction through the combiner transistor 77 and the resulting negative voltage developed at the output point 82 in conjunction with the applied positive-going portion of wave 88b biases off the combiner transistor 68. Thus, it is seen that, because of the inverse character and substantially equal amplitudes of the waves 88b and 88c of FIGS. 8B and 8C respectively, one or the other of the combiner transistors 68 and 77 of FIG. 4 is operative to produce a continuous negative gain-control voltage represented by the wave 88d of FIG. 8D. The amplitude of the gain-control voltage is representative of the relation of the white video signal samples to the clamped black video signals.

Figures 9A, 9B, 9C, 9D:
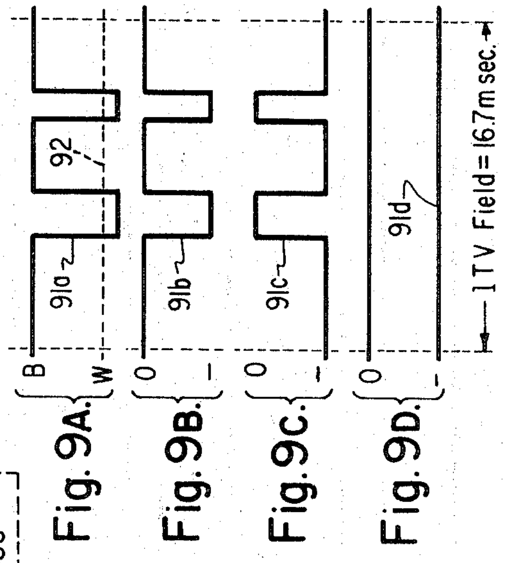
FIGS. 8A through 8D and 9A through 9D are somewhat idealized waveforms respectively of long and short duty cycle sample waves and their inverted and average value versions referred to in the explanation of the operation of the apparatus embodying the invention.

A video signal representing a picture having a relatively low average light level is depicted as the wave 91a of FIG. 9A. Such a signal is assumed to have the same negative-going peak white signal values relative to the clamped black signals as in the case previously described with reference to FIG. 8. It also is assumed that the threshold 92 is selected to be the same as in the former case. When the video signal represented by the wave 91a of FIG. 9A is sampled and amplified by the transistor 64 for its negative-going white representative information exceeding the threshold 92 and is processed by the coupling circuit including the transistor 67, the capacitor 69, the resistor 71 and the DC restorer diode 72, the short duty cycle wave 91b of FIG. 9B is produced. Similarly, the transistor 65 in cooperation with the coupling circuit including the transistor 73, the capacitor 74, the resistor 75 and the DC restorer diode 76, produces the wave 91c of FIG. 9C which is seen to be the inverse of the wave 91b of FIG. 9B. The impression of the waves 91b and 91c upon the respective signal combiner transistors 68 and 77 of FIG. 4 causes the operation of these devices to produce a negative gain-control voltage represented by the wave 91d of FIG. 9D. The amplitude of this wave is the same as that of the wave 88d of FIG. 8D because of the assumed identical peak white signal values and the same threshold level.

It, thus is seen that the novel double detection of the video signal in accordance with this invention produces an automatic gain-control signal which is substantially independent of the average picture level represented by the video signals.

The operation of the gain-controlling system of the invention in response to a vertical interval test signal is the same as that described. In such a case the white signal detector 32 of FIG. 4 produces a gain-control signal derived from that portion of the test signal which corresponds to picture white representative portions of a composite video signal. In a case where the selector switch 56 of the mode gate 33 of FIG. 3 is operated to its contact 62, the gain-control signal is derived from whichever one of the video or vertical interval test signals has the higher white signal peaks.

Figure 5:
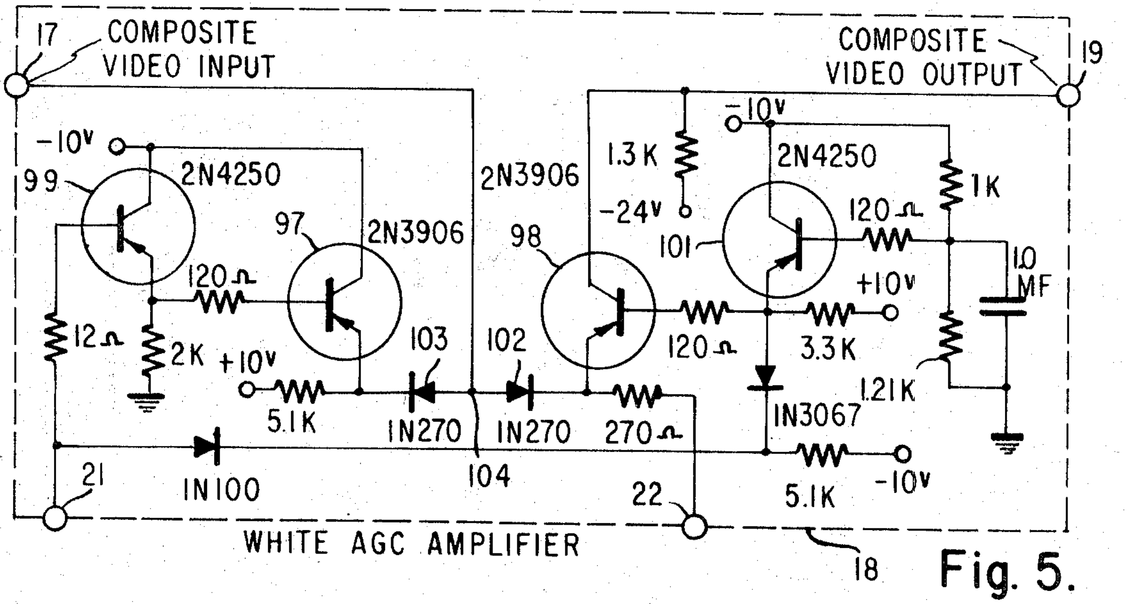
FIG. 5 is a schematic circuit diagram of the white AGC amplifier of FIG. 1.

The white AGC amplifier 18 of FIG. 5 includes a differential amplifier comprising a pair of PNP transistors 97 and 98, a PNP gain-control signal direct current amplifier transistor 99 and a PNP reference voltage amplifier transistor 101. The differential amplifier transistor 98 is operated as a substantially constant direct current device under the control of a reference voltage applied to its base electrode from the reference amplifier transistor 101 and an error signal applied to its emitter electrode and derived from the control signal terminal 22 and the sync tip clamp 27 as subsequently described.

The conductivity of the differential amplifier transistor 97 is varied under the control of the amplified gain-control signal applied to its base electrode from the amplifier transistor 99. The emitter electrodes of the differential amplifier transistors 97 and 98 are coupled together by diodes 102 and 103, to the junction point 104 to which the composite video signal at the input terminal 17 of the white AGC amplifier 18 is applied. The gain-controlled output composite video signal is derived from the collector electrode of the differential amplifier transistor 98 and is applied to the output terminal 19 of the white AGC amplifier.

In the operation of the white AGC amplifier 18 the composite video signal at the input terminal 17 is subject to division between the two paths including the respective differential amplifier transistors 97 and 98. For a video signal having all picture white representative portions below the level selected by the adjustment of the biasing potentiometer 66 of the white signal detector 32 of FIG. 4 substantially all of the video signal is transferred to the white AGC amplifier output terminal 19 through the amplifier transistor 98. Any video signal having picture white representative portions exceeding the selected level produces a negative gain-control signal, as described in conjunction with FIG. 4, which is applied via the control signal terminal 21 of FIG. 5 to the base electrode of the direct current amplifier transistor 99 and from the emitter electrode of this transistor to the base electrode of the differential amplifier transistor 97 to increase its conductivity. Thus, a portion of the video signal is diverted through the transistor 97, thereby reducing the amplitude of the composite video signal transferred through the transistor 98 to the output terminal 19. The signal at the terminal 19 is one in which the picture white representative signals are positive-going relative to the picture black representative signals and the synchronizing pulses. The gain controlled composite video signal developed at the output terminal 19 of the white AGC amplifier 18 is impressed upon the input terminal 25 of the video signal output amplifier 24 of FIG. 6. This amplifier includes a feedback pair of transistors 105 and 106 which function in their usual known manner to produce a composite video signal at its output terminal 26 in which the picture white representative signals are negative-going relative to the picture black representative signals and the synchronizing pulses.

Figure 6:
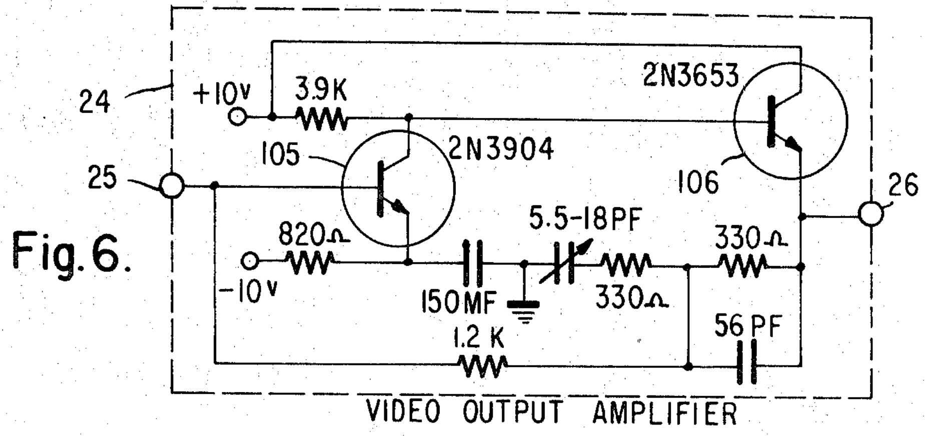
FIG. 6 is a schematic circuit diagram of the video output amplifier of FIG. 1.
Figure 7:
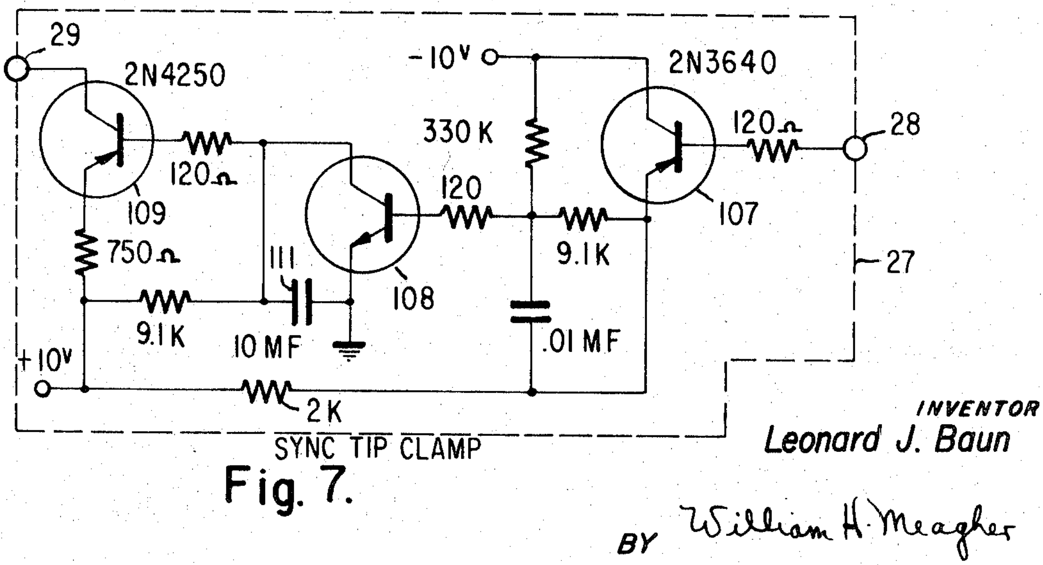
FIG. 7 is a schematic circuit diagram of the sync tip clamp of FIG. 1.

A sample of the gain-controlled composite video signal produced at the output terminal 26 of the video signal amplifier 24 of FIG. 6 is impressed upon the input terminal 28 of the sync tip clamp 27 of FIG. 7. This apparatus functions as a feedback clamp from the output of the video signal output amplifier 24 to the control signal terminal 22 of the white AGC amplifier 18 and the emitter electrode of the differential amplifier output transistor 98 of FIG. 5 to maintain a substantially constant direct current through that transistor. The clamp of FIG. 7 comprises an emitter follower isolating PNP input transistor 107, an NPN relatively high gain stage clamping transistor 108 and a PNP polarity inverting output transistor 109. In the composite video signal sample impressed upon the clamp input terminal 28 the synchronizing pulses are positive-going relative to the picture representative signals. The clamping transistor 108 effectively peak detects the synchronizing pulses to produce, in conjunction with a filter including a capacitor 111, a unidirectional voltage, the polarity of which is inverted by the transistor 109. Any change in the magnitude of this voltage constitutes an error signal representative of a shift in the direct current component of the composite video signal which may be produced by the operation of the white AGC amplifier 18 of FIG. 5.

In the operation of the white AGC amplifier 18 of FIG. 5 the application of the gain-control signal, derived from the white signal detector 32 of FIG. 4, to the amplifier transistor 97 through the transistor 99 produces a change in the direct current component of the composite video signal at the junction point 104 and, hence, at the output collector electrode of the amplifier transistor 98. Such a shift of the direct current component of the composite video signal affects the entire signal including the synchronizing pulses. It is such a shift that causes the sync tip clamp 27 of FIG. 7 to produce the described representative error signal. Consequently, the impression of the error signal modified voltage, developed at the output terminal 29 of the sync tip clamp 27, upon the control signal terminal 22 and the input emitter electrode of the amplifier transistor 98 of FIG. 5 effectively compensates for the described shift of the direct current component produced at the junction point 104 so as to restore the direct current component of the composite video signal at the collector electrode of the amplifier transistor 98 to its original value.

The automatic video signal gain-controlling apparatus of this invention, thus, functions to maintain a substantially constant level of a composite video signal by means of samples of the picture white representative signals exceeding a selected threshold level irrespective of the duty cycle of the samples and regardless of whether or not the samples are obtained from the video signal or from a vertical interval test signal or from a combination of both signals.

I claim:

1. In a television system, gain-controlling apparatus for automatically maintaining a desired amplitude level of a composite video signal including at least picture representative signals and horizontal and vertical blanking and synchronizing pulses, comprising:
   - a gain-controlling amplifier having input, output and control circuits;
   - means for impressing said composite video signal upon said amplifier input circuit;
   - means for deriving from said amplifier output circuit an amplified sample of said composite video signal;
   - means for clamping picture black representative portions of said video signal sample at a fixed reference potential;
   - picture white representative video signal-detecting means responsive to said clamped video signal sample and including a white signal sampler operative to produce a first white signal sample wave having an amplitude representative of the excess of said white signal samples beyond said desired amplitude level and a second white signal sample wave having an amplitude which is the inverse of said first white signal sample wave amplitude;
   - said detecting means further comprising signal-combining means coupled to receive said first and second white signal sample waves from said white signal sampler for producing a gain-control signal having an amplitude representing the greater one of said first and second white signal sample wave amplitudes; and
   - means for impressing said gain-control signal upon the control circuit of said gain-controlling amplifier to automatically maintain the composite video signal in said amplifier output circuit at the desired substantially constant amplitude level.

2. Automatic video signal gain-controlling apparatus as defined in claim 1, said composite video signal also including a vertical interval test signal, and said apparatus additionally comprising: a mode gate coupled between said picture black representative signal-clamping means and said picture white representative signal-detecting means, said mode gate being selectively operable to impress upon said detecting means either one or both of said picture representative and vertical interval test signals.

3. Automatic video signal gain-controlling apparatus as defined in claim 1, wherein:
   - said white signal sampler comprises a white signal-sampling device for producing said first white signal sample wave; and
   - a white signal-inverting device coupled to said white signal-sampling device for producing said second white device coupled sample wave.

4. Automatic video signal gain-controlling apparatus as defined in claim 3, wherein;
   - said white signal-sampling and inverting devices are opposite conductivity types of transistors, both connected for common emitter operation and having their respective emitter electrodes connected together;

said clamped composite video signal sample being applied by coupling means to the base electrode of said white signal-sampling transistor, and the base electrode of said white signal inverter transistor being connected to a fixed reference potential; and said first and second white signal sample waves being developed at the collector electrodes of said white signal-sampling and inverting transistors respectively.

5. Automatic video signal gain-controlling apparatus as defined in claim 4, wherein:

said signal combiner comprises a first pair of two like signal-translating devices having individual input circuits and having an interconnection to provide a common output circuit;

said first and second white signal sample waves being impressed upon the respective input circuits of said first pair of like signal-translating devices to render conducting that device receiving the larger amplitude one of said first and second signal sample waves; and said interconnection being such that the one of said first pair of like devices receiving the smaller amplitude one of said first and second white signal sample waves is rendered nonconducting.

6. Automatic video signal gain-controlling apparatus as defined in claim 5, wherein:

said first pair of two like signal-translating devices of said combiner are transistors of the same conductivity type, each having its base electrode included in its input circuit and its emitter and collector electrodes included in its output circuit; and said interconnection comprising a coupling between like one of the output circuit electrodes of said respective transistors.

7. Automatic video signal gain-controlling apparatus as defined in claim 6, wherein: said interconnection comprises a coupling between the emitter electrodes of said respectivelike signal-translating transistors.

8. Automatic video signal gain-controllng apparatus as defined in claim 7, wherein: said gain-controlling amplifier is a differential arrangement of a second pair of two like signal-translating devices having an interconnection forming said input circuit, one of said devices being included in said output circuit and the other of said devices being included in said control circuit.

9. Automatic video signal gain-controlling apparatus as defined in claim 8, wherein:

said second pair of two like signal-translating devices of said gain-controlling amplifier are transistors of the same conductivity type, each having base, emitter and collector electrodes;

said interconnection comprising a coupling between the emitter electrodes of said second pair of transistors;

means for impressing a fixed reference potential upon the base electrode of a first one of said second pair of transistors;

said amplifier output circuit including the collector electrode of said first one of said second pair of transistors; and means for impressing said gain-control signal derived from said signal combiner upon the pass electrode of the second one of said second pair of transistors.

10. Automatic video signal gain-controlling apparatus as defined in claim 9, wherein: said coupling means by which said clamped composite video signal sample is applied to the base electrode of the white signal-sampling transistor of said white signal sampler includes means for impressing a biasing potential upon said base electrode to establish an operating threshold for said white signal sampling transistor.

11. Automatic video signal gain-controlling apparatus as defined in claim 10, wherein: said biasing potential impressing means is variable so as to adjust the white signal level at which said apparatus is rendered operative to automatically control the video signal gain.

12. Automatic video signal gain-controlling apparatus as defined in claim 11, said composite video signal also including a vertical interval test signal, and said apparatus additionally comprising:

a mode gate including two transistors having their respective collector-to-emitter circuits effectively connectable in shunt with the video signal path between said picture black representative signal-clamping means and said picture white representative signal-detecting means; and selector means operable for rendering the collector-to-emitter circuit of a first one of said mode gate transistors conductive only during the occurrence of said vertical interval test signal, thereby impressing only the picture representative signal upon said white signal-detecting means, said selector means also being operable for rendering the collector-to-emitter circuit of the second one of said mode gate transistors conductive at all times except during the occurrence of said vertical interval test signal, thereby impressing only said vertical interval test signal upon said white signal detecting means, said selector means additionally being operable for rendering the collector-to-emitter circuits of both of said first and second mode gate transistors nonconducting at all times, thereby impressing both of said picture representative and vertical interval test signals upon said white signal-detecting means.

13. Automatic video signal gain-controlling apparatus as defined in claim 12, wherein:

said selector means includes a switch operable to impress a gating pulse received during the occurrence of said vertical interval test signal upon a selected one of three contacts, first and second ones of said contacts being connected to the respective base electrodes of said first and second mode gate transistors and a third one of said switch contacts being unconnected.

14. Automatic video signal gain-controlling apparatus as defined in claim 13, wherein:

said gating pulse has a negative potential during the occurrence of said vertical interval test signal and a positive potential at all other times;

said first mode gate transistor being a PNP type, whereby with said switch operated to said first contact only the negative potential portion of said gating pulse renders the collector-to-emitter circuit of said PNP transistor conductive, said PNP transistor being nonconductive at all other times;

said second mode gate transistor being an NPN type, whereby with said switch operated to said second contact only the negative potential portion of said gating pulse renders the collector-to-emitter circuit of said NPN transistor nonconductive, said NPN transistor being conductive at all other times; and with said switch operated to said third contact said gating pulse is disconnected from the base electrodes of both of said PNP and NPN transistors, thereby rendering the collector-to-emitter circuits of both transistors nonconductive at all times.

UNITED STATES PATENT OFFICE

CERTIFICATE OF CORRECTION

Patent No. 3,569,620 Dated March 9, 1971

Inventor(s) Leonard J. Baun

It is certified that error appears in the above-identified paten and that said Letters Patent are hereby corrected as shown below:

Column 1, line 7, that portion reading "video signal" , fi occurrence, should read -- a --.

Column 5, line 51, that portion reading "control is" shoul read -- control signal is --.
Column 6, line 5, that portion reading "88b" should read -- 88c --.
Column 9, line 63, that portion reading "pass" should read -- base --.

Signed and sealed this 31st day of August 1971.

(SEAL)
Attest:

EDWARD M.FLETCHER,JR.
Attesting Officer

ROBERT GOTTSCHALK
Acting Commissioner of P